March 9, 1943.   N. TRBOJEVICH   2,313,183
TRANSMISSIONS AND GEAR TEETH
Filed Nov. 4, 1941   2 Sheets-Sheet 2
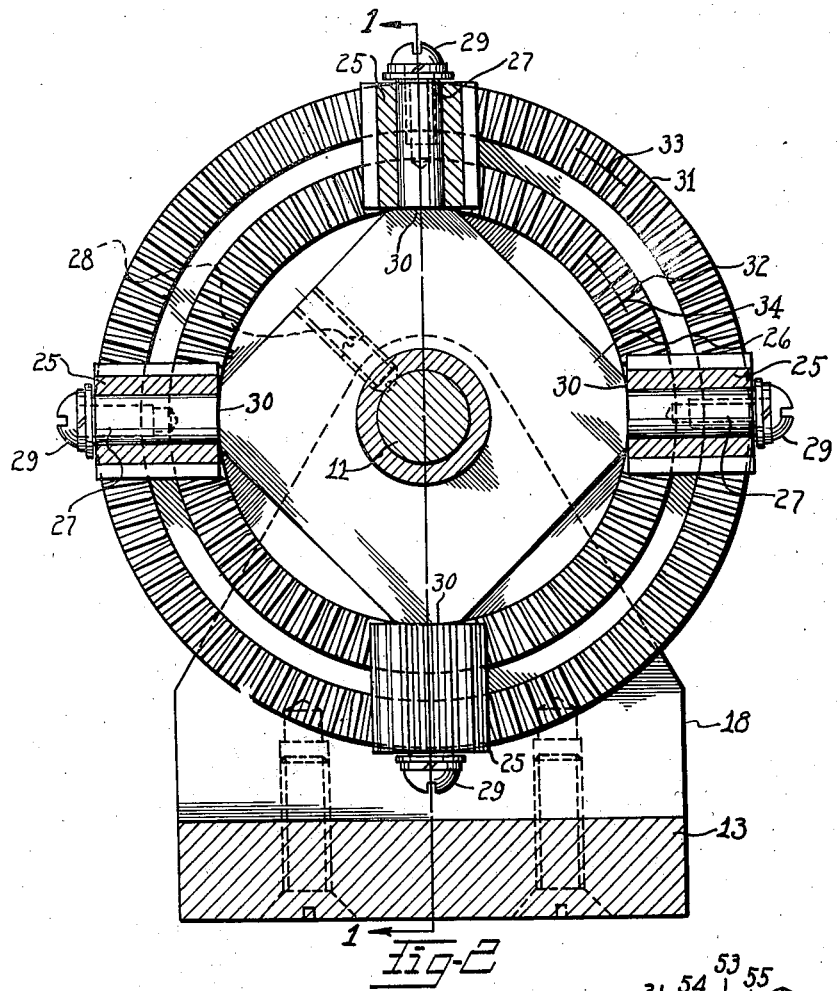
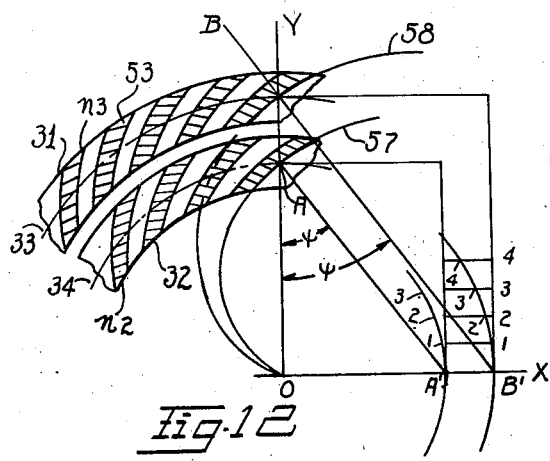
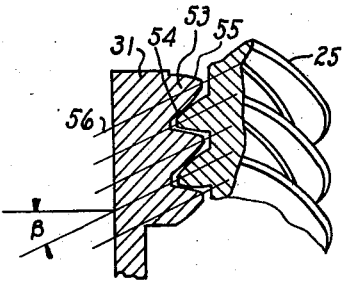
INVENTOR
Nikola Trbojevich Patented Mar. 9, 1943

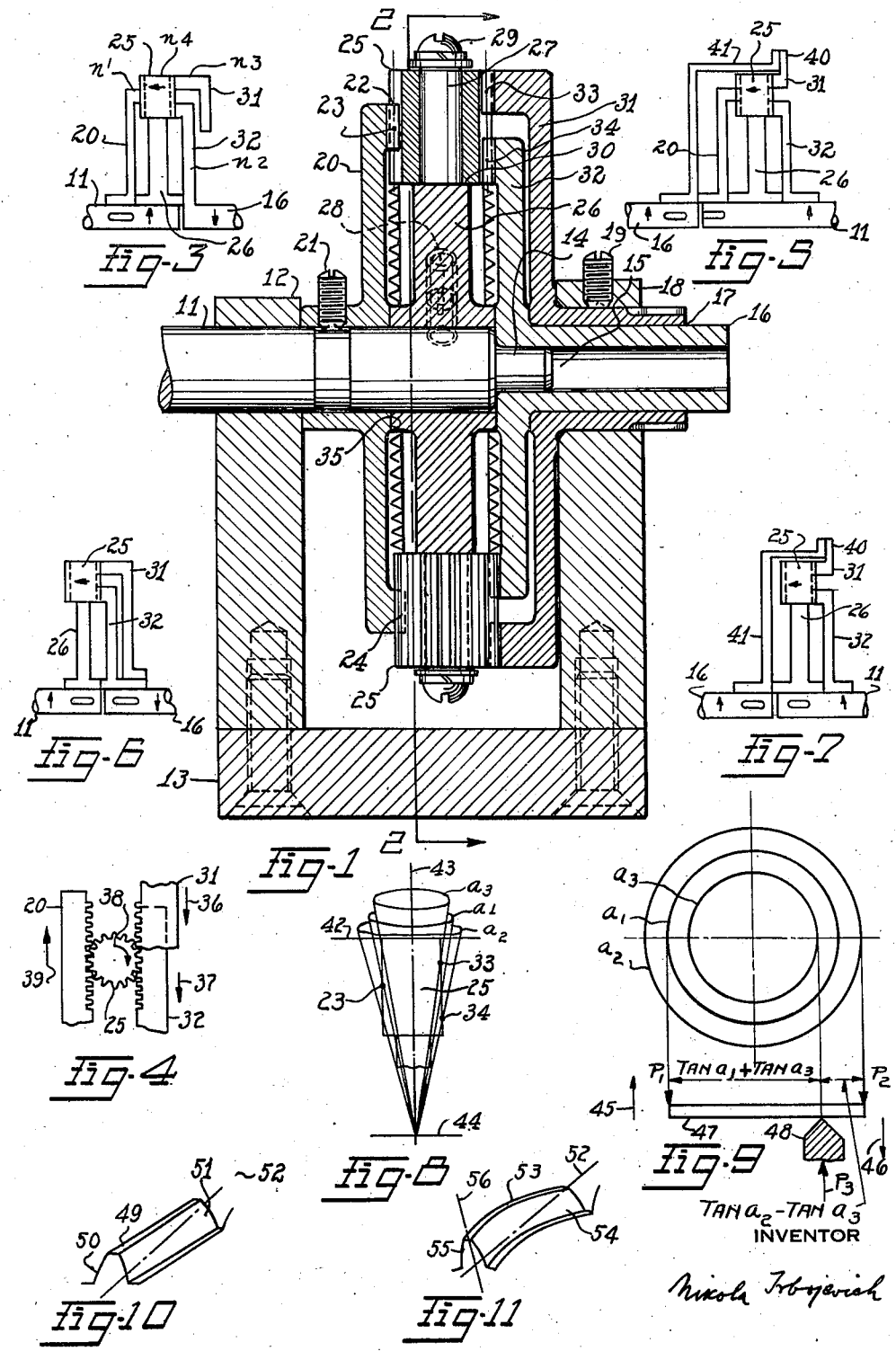

2,313,183

UNITED STATES PATENT OFFICE 2,313,183

TRANSMISSION AND GEAR TEETH

Nikola Trbojevich, Toledo, Ohio

Application November 4, 1941, Serial No. 417,792

7 Claims. (Cl. 74—303)

The invention relates to planetary transmissions of the compound type and gear teeth for the same.

The compound transmissions forming the subject matter of this application are of two kinds, viz., the ordinary compound and the triply compound types.

In each case the characteristic feature is the employment of a spider comprising a single row of cylindrical pinions radially disposed in a circle in a plane and two side gears of the crown type nesting in each other and contacting the pinions in the common tangent plane thereof. This arrangement is new to my knowledge because heretofore compound planetary transmissions could not be constructed without the use of two or more rows of pinions disposed in a plurality of planes, the number of series of the pinions corresponding to the degree of composition of the transmission.

According to my invention the construction of the spider is simplified to such an extent that the construction of multiple compound transmissions not only does not present any considerable practical difficulty but is imperative in certain classes of work such as for the propulsion of large airplane propellers and the like.

The object is to transmit a rotation in a coaxial direction through a wide range of ratios.

Another object is to reverse the direction of rotation from the engine to the propeller when such a reversal is necessary without the use of any additional gearing.

A further object is to construct a transmission which may be used either as an ordinary or a triply compound device by merely changing the "hook-up."

Another object is to reduce the bearing pressures and the bending moments in the trunnions of the spider.

Another object is to transmit heavy torques in applications in which the reduction of the weight and volume is essential, e. g. in airplanes and speedboats.

The formation of the teeth in the gears used in these transmissions will be hereinafter explained. For the best results and preferably, the new type of spiral gearing described in my two copending applications, Serial No. 404,882, filed July 31, 1941, and Serial No. 355,848 filed Sept. 7, 1940, should be used.

In the drawings:

Figure 1 is the elevation in cross section of the new compound transmission.

Figure 2 is side view thereof in cross section taken in the plane 2—2 of Figure 1.

Figures 3 to 9 incl. are geometrical diagrams explanatory of the four principal modifications of this transmission and used in deducing the Equations 1 to 11 incl. found in the description.

Figures 10 and 11 are diagrams in perspective showing the formation of teeth in the crown gears of straight and spiral types.

Figure 12 is a diagram showing the generation of longitudinal tooth curves in two nesting and cooperating crown gears.

Figure 13 is a fragmentary view of the improved spiral gear and pinion in mesh.

As shown in Figures 1 and 2, the drive shaft 11 is rotatably housed in the bearing 12 fixed to the relatively immobile base 13 and is provided at its end with a pilot 14 of a lesser diameter, the said pilot being rotatable in a corresponding hole 15 formed in the adjacent end of the coaxially disposed driven shaft 16. The latter shaft is rotatable in the sleeve 17 which, in turn, is rotatable in the bearing 18 affixed to the said base 13. The sleeve 17 may be used as an alternate driven member, or it may be clamped relative to the bearing 18 by tightening the set screw 19.

The first drive gear 20 is rotatably mounted upon the drive shaft 11 but, again, it may be clamped thereto by means of the set screw 21. The said gear is provided with a plurality of equispaced generated teeth 22 all of a constant depth and arranged in the plane of rotation in a circular zone. These teeth are of a variable cross contour throughout their lengths, see also Fig. 10, and are formed in a gear shaping machine by using the so-called "face cutting attachment." The contour thus obtained will mesh with a spur pinion along an inclined pitch line 52 diagonally crossing the teeth, i. e. the engagement is of the conical or spherical type. For this reason, the face 24 of this gear cannot be unduly wide nor the pinions can be disproportionately large. However, the gear is suitable for this type of work as I have proved experimentally. The teeth are equispaced along the median circle 23 corresponding to the pitch of the mating pinion 25.

The spider 26 consists of a rotatable core about which a plurality of radially extending trunnions 27 are integrally formed. The said spider may freely rotate about the drive shaft 11, when triply compound, or it may be clamped to the said shaft by means of the set screw 28, when only ordinarily compound. The pinions 25 are in both cases rotatable about the said trunnions and are prevented from drifting outwardly or inwardly by means of the cap screws 29 and the abutting seats 30 formed in the core of the spider, respectively.

At the right side of the spider a large or outer side gear 31, which is preferably made integral with the already mentioned sleeve 17, and a smaller or inner gear 32, which is preferably made integral with the driven shaft 16 are coaxially mounted to contact all of the pinions parallel to the plane of rotation of the spider. The teeth of these two gears (which are "nesting" in each other) are formed in the manner previously described and are spaced in accordance with the pitch of the pinions in the median or pitch circles 33 and 34 respectively, from which it follows that their corresponding numbers of teeth are different from each other.

An axial motion or play of the described members is restricted to a predetermined slight distance by accurately delimiting the lengths of the shoulders 35 in all members.

The mechanism shown in Figures 1 and 2 illustrates all of the aspects of my invention in a single design, i. e. the mechanism may be used either as an ordinary or a triply compound transmission and with or without the reversal of the sense of rotation from the driving to the driven shafts. The transmutation to any one of these four modifications is effected by tightening or loosening the set screws 21, 28 and 19 in a certain order as it will be now described. There is still another, the fifth modification available, comprising the direct drive in one to one ratio, but that, of course, involves no invention. It is to be noted that the said set screws, while operative, are not the best means for the clutching and declutching operations which are indicated and I reserve the right to use other and more effective means, such as sliding keys or splined clutches, for that purpose. The set screws are used, therefore, somewhat symbolically for the purpose of clarity. The modifications, thus, are:

1. In order to obtain a triply compound modification with the direction of rotation reversed from the input to the output shafts, I tighten the set screws 21 and 19, loosen the screw 28 and garner the torque from the shaft 16.

2. To obtain the same without the reversal of rotation, I tighten the set screw 21, leave the screws 19 and 28 loose, hold the inner gear 32 fixed and garner the resultant torque from the outer gear 31 via the sleeve 17.

3. To obtain an ordinary compound modification with the rotation reversed, I tighten the screws 28 and 19, loosen the screw 21 and garner the torque from the shaft 16.

4. To obtain the same without the reversal of rotation, I tighten the screw 28, loosen the screws 19 and 21, hold the inner gear 32 fixed and garner the torque from the sleeve 17.

5. To obtain a direct drive, I tighten the screws 21 and 28, loosen the screw 19 and garner the torque from either the shaft 16 or the sleeve 17, or from both.

The mathematical theory of this transmission will now be explained.

In Figures 3 and 4 the condition stipulated in the modification 1 above stated are diagrammatically illustrated in two corresponding projections. The numbers of teeth in the three crown gears are proportional to their pitch radii (being all of the same circular pitch equal to that of the pinion) and are correspondingly designated in the gears 20, 32 and 31 as $n_1$, $n_2$ and $n_3$, of which $n_1$ is the driver, $n_2$ the driven and $n_3$ the fixed gear. The kinematical relationship which makes this invention possible is shown in Figure 4 in which the three crown gears are shown in their plane developments, i. e. as three racks of the same pitch, two of them engaging the planetary pinion 25 at one side thereof and the third one on the opposite side. It is significant that in this mechanism the relative linear velocities of all three crown gears with respect to a stationary spider are all of the same absolute value although of positive or negative signs as the case may be, but their angular velocities are not the same due to the difference in the corresponding numbers of teeth in the said gears. Thus, when the gear 31 rotates in the direction of the arrow 36, the gear 32 will move with an equal linear velocity 37 in the same direction, the pinion 25 will rotate in the direction of the arrow 38 and the gear 20 will rotate in the opposite direction with the velocity 39 of the same absolute magnitude.

This fact enables me to determine the ratio of transmission $Q_1$ as a function of the three corresponding numbers of teeth $n_1$, $n_2$ and $n_3$. If in Figure 3 I assume that the "top going" direction indicates a positive and "top coming" a negative rotation of the gears, I also may assume that the planetary motion of the pinion 25 is resolved into two components, first a rotation of the spider without a corresponding rotation of the pinion about its axis and second, a rotation of the pinion without the rotation of the spider, i. e. with the spider held stationary.

Thus, for $a+1$ rotation of the spider 26 the gears $n_1$, $n_2$ and $n_3$ will all turn $+1$ times and the pinion $n_4$ will turn 0 times. I now hold the spider 26 fixed and rotate the stationary gear $n_3$ backwards $(-1)$ times. This will rotate the pinion $$\frac{n_3}{n_4}$$

times, the gear $n_1$ $$\left(\frac{n_3}{n_1}\right)$$

times, and the gear $n_2$ $$\left(\frac{-n_3}{n_2}\right)$$

times. Adding the corresponding components for the last two gears, I get the respective values for the angular velocities as $$\left(1+\frac{n_3}{n_1}\right)$$

and $$\left(1-\frac{n_3}{n_2}\right)$$

Inasmuch as $n_3 > n_2$ it is seen that the angular velocity of the driven gear is negative because $$\frac{n_3}{n_2} > 1$$

Hence, $$Q_1 = \frac{1+\frac{n_3}{n_1}}{1-\frac{n_3}{n_2}} \frac{\text{driver}}{\text{driven}} \qquad (1)$$

or $$Q_1 = -\frac{n_2(n_1+n_3)}{n_1(n_3-n_2)} \qquad (2) \text{ Q. E. D.}$$

I shall now discuss the problem or modification

No. 2 dealing with the triply compound transmission in which the direction of rotation is not reversed. This necessitates using the smaller one of the two nesting gears as the fixed gear and this fact presents certain difficulties of an entirely mechanical nature but none theoretically. In Figure 5 a method of hooking up the gears is diagrammatically shown whereby the smaller gear 32 may be fixed to the frame or base of the transmission without interfering with the rotation of the other two gears 31 and 20 respectively. For this purpose I provide the gear 31 with an outwardly extending flange 40 upon which a bell shaped member 41 is bolted and keyed to the driven shaft 16 by means of the integrally formed sleeve. The inner gear 32 is provided with an integrally formed flange and keyed to the base of the transmission or to some other fixed object. The drive shaft 11 now rotatably runs through the said flange, the spider 26 and is keyed to the side gear 20.

The formula for the ratio of transmission $Q_2$ is derived in an analogous manner to that already explained in connection with the ratio $Q_1$, but more briefly, the formula may be derived from the Equation 1 by merely interchanging the positions of the numerals $n_2$ and $n_3$. Thus:

$$Q_2 = \frac{1 + \frac{n_2}{n_1}}{1 - \frac{n_2}{n_3}} \quad (3)$$

or simplified, $$Q_2 = \frac{n_3(n_1 + n_2)}{n_1(n_3 - n_2)} \quad (4)$$

In this substitution the negative sign in the Equation 2 cancels out in the transformed Equation 4 which means that the sense of rotation of the driven shaft is now positive.

The modification No. 3 specifying an ordinary compound transmission with the direction of rotation reversed from the driving to the driven members is diagrammatically shown in Figure 6. In this case the driving shaft 11 is directly keyed to the spider 26, the outer gear 31 is fixed, the inner gear 32 serves as the torque output and the gear 20 is omitted.

The formula for the velocity ratio $Q_3$ is derived from the Equation 1 by omitting the member $$\frac{n_3}{n_1}$$

from the numerator. This is justified from the method in which the formula was derived, i. e. it will be remembered that during the second component of the differential rotation the displacement of the spider was nil. Hence $$Q_3 = \frac{1}{1 - \frac{n_3}{n_2}} \quad (5)$$

or $$Q_3 = -\frac{n_2}{n_3 - n_2} \quad (6)$$

The modification No. 4 specifying the above case without the reversal of rotation is diagrammatically shown in Figure 7. The spider 26 is keyed to the driving shaft 11, the outer gear 31 is keyed to the driven shaft 16 through the medium of the bell 41, the inner gear 32 is fixed to the frame and the gear 20 is omitted. The ratio $Q_4$ is derived from the Equation 3 by making the numerator of the fraction equal to unity, viz.

$$Q_4 = \frac{1}{1 - \frac{n_2}{n_3}} \quad (7)$$

or $$Q_4 = \frac{n_3}{n_3 - n_2} \quad (8)$$

From the above explanation it will be seen that my invention is based upon the principle of so constructing and calculating the teeth in two (or three) crown gears adjacent to and meshing with a cylindrical pinion that the said pinion will possess two (or three) coaxial pitch cones and for the purposes of kinematics will be equivalent to two (or three) bevel pinions all keyed together but each having a different pitch cone angle. In addition to the advantage of the mechanical simplicity of this arrangement the torque ability of the mechanism is also increased due to the increased cross sectional area of the pinion teeth, as a result of its increased width of face made possible by this invention.

The new theory of multiple pitch cones existing in a cylindrical pinion is illustrated in Figures 8 and 9 which represents the kinematic conditions found in the modification No. 1. The pinion 25 which is simultaneously rotatable about two orthogonal intersecting axes 43 and 44 possesses three pitch points 23, 34 and 33 through which the three pitch cones $a_1$, $a_2$ and $a_3$ respectively are drawn from the origin. By intersecting the said three cones with a plane 42 at right angles to the axis 43 at an arbitrary unit distance from the origin, three concentric circles are obtained, see Figure 9. Of these circles one is the driver, another is driven and the remaining one is fixed. The radii of the circles at the unit distance from the cone apex are numerically equal to the tangents of the cone angles and these in turn are inversely proportional to the numbers of teeth $n_1$, $n_2$ and $n_3$ of the corresponding crown gears 20, 32 and 31. Upon constructing a beam 47 having a fixed pivot 48 corresponding to the fixed cone $a_3$ by projection it is found that the driving tangential force $P_1$ has an arm equal to $\tan a_1 + \tan a_3$ about the pivot 48 while the driven or resultant force $P_2$ has an arm of $\tan a_2 - \tan a_3$. It is further seen that the direction of rotation is reversed from the driver to the driven according to the arrows 45 and 46. From this ratio of transmission $Q_1$ may be written down:

$$Q_1 = \frac{\tan a_1 + \tan a_3}{\tan a_2 - \tan a_3} \quad (9)$$

but $$\tan a_1 \sim \frac{1}{n_1} \text{ etc.}$$

$$Q_1 = \frac{\frac{1}{n_1} + \frac{1}{n_3}}{\frac{1}{n_2} - \frac{1}{n_3}} \quad (10)$$

after multiplying by $n_3$, I have $$Q_1 = \frac{1 + \frac{n_3}{n_1}}{1 - \frac{n_3}{n_2}} \quad (11) \text{ Q. E. D.}$$

which is identical with the Equation 1 obtained in an entirely different manner, thus proving the theorem.

Figure 9 is instructive from a practical engineering point of view. It is seen that the tooth loads $P_2$ and $P_3$ acting at one side of the pinion are incomparably greater than the force $P_1$ acting at the other side of the pinion. Hence, very considerable separating forces are generated due to the pressure angle of the pinion teeth. This separating resultant, directed towards the side gear 20 is taken up by the latter in the form of an end thrust. Thus, the gear 20 apart from kinematical considerations has an added utility per se and its employment is warranted as a means of removing the bending moments from the trunnions of the spider. For this reason the new transmission is ideally suitable for carrying heavy torques.

In Figure 10 a straight tooth 49 used in crown gears 20, 31 and 32 is diagrammatically shown in perspective. The characteristic features of these teeth are that first, they are of constant depth although meshing in a conical manner, second they have a lesser pressure angle at their small or inner ends 50 than at large ends 51 and third, the pitch line 52 crosses them at an angle diagonally beginning at the bottom of the profile 50 at the small end and emerging at the top of the profile at 51 at the large end.

Spiral teeth for this transmission

For large loadings, silent running and an abundant overlap, spiral teeth should be employed. The design and manufacture of such teeth is not at all obvious, but is a result of a protracted research, as was indicated in my mentioned application Ser. No. 404,882. The problem was solved by constructing the teeth in the mating wheel and pinion in such a manner that the transverse tooth axes of wheel teeth are divergent relative to the axis of rotation as looked upon from the rear side of the wheel, while the transverse axes of the pinion teeth are offset relative to the axis of rotation thus resulting in asymmetrical teeth in both pinion and wheel. The object was to produce long and short radii of curvature on the opposite sides of the teeth in both members, and in particular to increase the radius of curvature at the concave side of wheel tooth and to reduce the radius of curvature in the mating side of the pinion tooth according to a mathematically definite plan.

A tooth of this description is shown diagrammatically and in perspective in Figure 11. The teeth 53 of the wheel have a greater pressure angle at their concave sides 54 than at their convex sides 55 which is equivalent to saying that their cross axes 56 are inclined at an angle relative to the axis of rotation. This irregular formation is still further accented by the fact that the pitch line 52 diagonally crosses each tooth entering as it does at the bottoms of the small ends and emerging at the tops of the large ends of the said teeth. However, the teeth are capable of meshing with a line contact with teeth of the improved pinions.

The theory of constructing spiral teeth in two nesting crown wheels to mesh with a given cylindrical pinion will now be only briefly explained because the full data were already given in my mentioned application. In Figure 12 two such nesting gears 31 and 32 having the corresponding numbers of teeth $n_3$ and $n_2$ equispaced in their corresponding pitch circles, are shown. An XY orthogonal system is first assumed and the respective pitch circles 33 and 34 are drawn from the origin O thus obtaining the pitch points B and A. A complement to the helix angle of the pinion $\psi$ is tentatively assumed (subject to further calculations as to the radii of curvature in wheel and pinion teeth) and the normals AA' and BB' are drawn thus defining the instantaneous centers of rotation A' and B' respectively in the X axis as well as the polar subnormals OA' and OB' of the Archimedean spirals 57 and 58 respectively. The critical points for interference between meshing teeth are at the pitch point A for the concave sides of the gear teeth and at the pitch point B for the convex sides, the said two points representing the minimum and maximum values for the curvature of the Archimedean spirals for both gears 32 and 31. From this data the pinion is designed, and in particular, the angle $\beta$ is determined, the said angle representing the inclination of the tooth cross axes 56 relative to the axis of rotation of the gears 31 and 32, i. e. it is the measure of lopsidedness or asymmetry which must be employed in the given case, See Figure 13.

In Figure 13 the improved teeth of the meshing pinion 25 and the wheels 31 or 32 are shown in cross section.

What I claim is:

1. In a transmission the combination of a rotatable cylindrical pinion simultaneously in mesh with two coplanar and coaxial side gears in contact therewith in a tangent plane and nesting in each other, in which the formation of the meshing teeth in the pinion and gears is such that the pinion teeth are longitudinally curved along a helix, have constant cross contours throughout their lengths and are asymmetrically formed at the opposite sides of each tooth, and the gear teeth are longitudinally curved along two sets of Archimedean spirals developed from two different polar subnormals, one set for each gear and have variable and asymmetrical cross contours throughout their lengths for the purpose of improving the nature and duration of contact.

2. A planetary transmission comprising a rotatable spider, a plurality of trunnions radially extending from the said spider in a plane, a plurality of cylindrical pinions rotatably mounted upon the said trunnions and two crown gears coaxial with the said spider, nesting in each other and simultaneously contacting all of the said pinions in a common tangent plane, in which the pinion teeth are of the same thickness and cross contour and the teeth of the said crown gears are of a variable thickness and cross contour throughout their lengths and are further of a different cross contour in each crown gear in order to obtain a line contact with the mating pinion teeth extending from end to end of the said crown teeth.

3. A planetary transmission comprising a rotatable spider provided with a plurality of radially extending trunnions in a plane, a plurality of pinions rotatable upon the said trunnions and two crown gears coaxial with the spider, nesting in each other and contacting all of the said pinions simultaneously in a common tangent plane, in which the pinion teeth are all of the same cross contour and curvature throughout their lengths, are longitudinally curved along a helix and have an asymmetrical cross contour in any transverse section thereof, and the crown teeth are longitudinally curved along two series of Archimedean spirals, and have a variable and asymmetrical cross contour and a variable radius of curvature at every point for the purpose of obtaining a line contact with the mating pinion teeth extending from end to end of the said crown teeth.

4. A planetary transmission comprising a rotatable spider, a plurality of radially extending extending from the said spider in a plane, a plurality of cylindrical pinions rotatably mounted upon the said trunnions and three crown gears coaxial with said spider, two of them nesting in each other and contacting the pinions at their one side in a common tangent plane and the third one contacting the said pinions at their other side in a plane parallel to the first tangent plane, in which the pinion teeth are of the same thickness and cross contour throughout their lengths and the teeth of the crown gears are of a variable thickness and cross contour throughout their lengths and are further of a different cross contour in each of the said crown gears depending upon their respective numbers of teeth for the purpose of obtaining a simultaneous line contact in all mating members extending from end to end of the said crown teeth.

5. A planetary transmission comprising a rotatable spider, a plurality of trunnions radially extending in a plane from the said spider, a plurality of cylindrical pinions rotatably mounted upon the said trunnions and three crown gears coaxial with the said spider, two of them nesting in each other and contacting the pinions at their one side in a common tangent plane and the third one contacting the said pinions at their other side in a plane parallel to the said first tangent plane, in which the pinion teeth are all of the same cross contour and curvature throughout their lengths, are longitudinally curved along a helix and have an asymmetrical cross contour in any transverse section thereof, and the crown teeth are longitudinally curved along a plurality of series of Archimedean spirals and have a variable and asymmetrical cross contour and a variable radius of curvature at every point for the purpose of obtaining a line contact with the mating pinion teeth extending from end to end of the said crown teeth.

6. A planetary transmission comprising a rotatable spider, a plurality of radially extending trunnions in a plane from the said spider, a plurality of cylindrical pinions rotatable upon the said trunnions and a plurality of crown gears coaxial with the said spider and contacting the said pinions at their opposite sides in two parallel tangent planes, in which the pinion teeth are longitudinally curved along a helix, disposed in a cylindrical surface, and have the same cross contour and curvature at every point thereof, and the mating crown teeth are longitudinally curved along a series of Archimedean spirals, are disposed in a plane and are of a variable cross contour, thickness and curvature throughout their lengths for the purpose of obtaining a line contact with the pinion teeth.

7. A planetary transmission comprising a rotatable spider having a plurality of radially extending arms in its plane of rotation, a plurality of pinions rotatably mounted upon the said arms, and a plurality of crown gears each meshing with all the said pinions in a tangent plane thereof and coaxial with the said spider, in which the pinion teeth are longitudinally curved along a helix, are disposed in a cylindrical surface and have an asymmetric and constant cross contour throughout their lengths and the mating crown teeth are longitudinally curved along a series of Archimedean spirals disposed in a plane and have an asymmetric and variable cross contour throughout their respective lengths, the object being to obtain a simultaneous line contact in all of the mating teeth and a tooth overlap of the greatest possible duration.

NIKOLA TRBOJEVICH.